United States Patent [19]

Rysti

[11] 4,205,751

[45] Jun. 3, 1980

[54] METHOD AND APPARATUS FOR SORTING TIMBER

[76] Inventor: Alpo Rysti, Frisansintie 22, 02240 Espoo 24, Finland

[21] Appl. No.: 913,484

[22] Filed: Jun. 7, 1978

[51] Int. Cl.² .............................................. B07C 5/14
[52] U.S. Cl. .................................. 209/517; 209/933
[58] Field of Search ............... 209/517, 518, 519, 520, 209/521, 933

[56] References Cited

U.S. PATENT DOCUMENTS

| | | | |
|---|---|---|---|
| 3,604,563 | 9/1971 | Ronan | 209/933 |
| 3,696,948 | 10/1972 | Murdoch | 209/933 |
| 3,776,379 | 12/1973 | Harvey | 209/933 |
| 4,104,156 | 8/1978 | Fletcher | 209/521 |

*Primary Examiner*—Allen N. Knowles
*Attorney, Agent, or Firm*—Steinberg and Blake

[57] ABSTRACT

A sorting apparatus for selectively sorting timber into different compartments. When a compartment is filled, it is emptied onto a conveyor for removing the timber from the apparatus. Each of the compartments includes a flexible support which can be lowered beneath the dividing wall of the compartment to form an opening through which the timber can empty onto the conveyor. The flexible support is then pulled tightly to ensure that all of the timber leaves the compartment.

12 Claims, 8 Drawing Figures

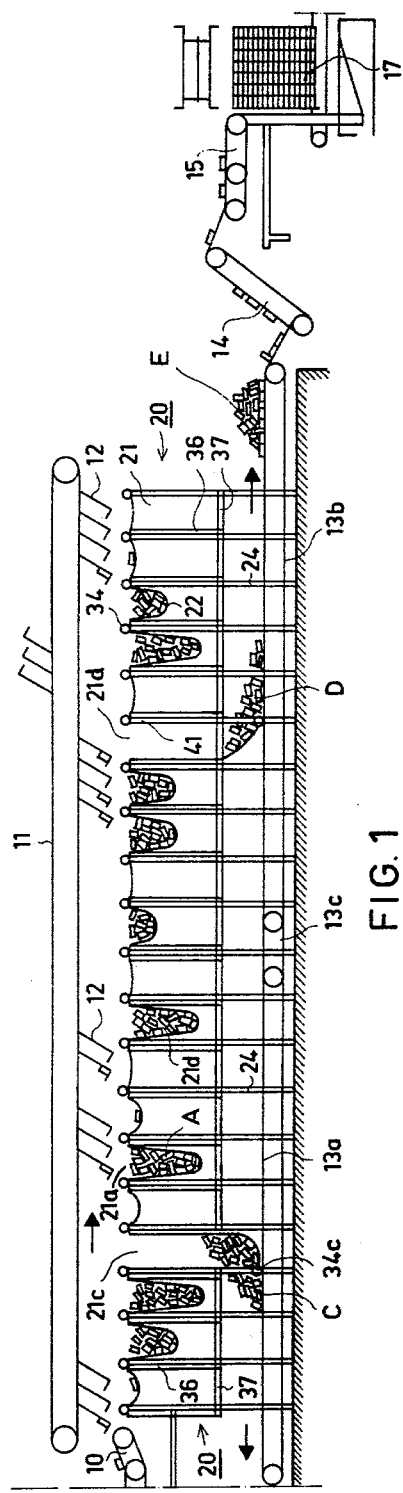
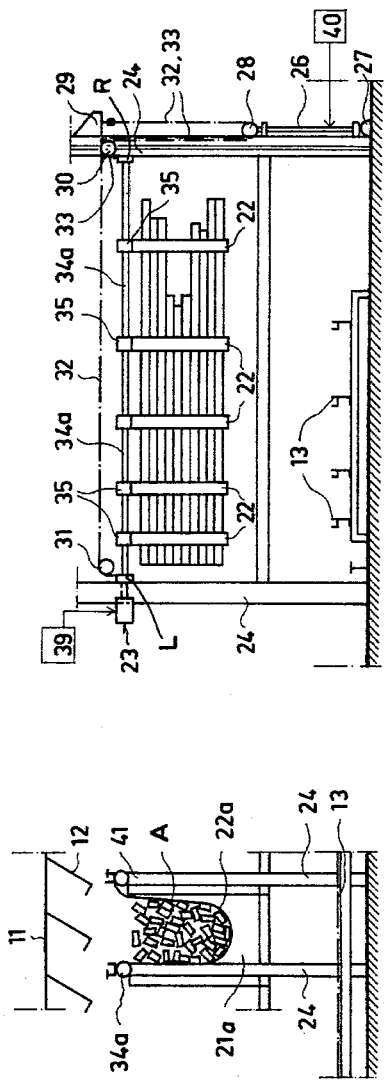
FIG. 1
FIG. 2
FIG. 3

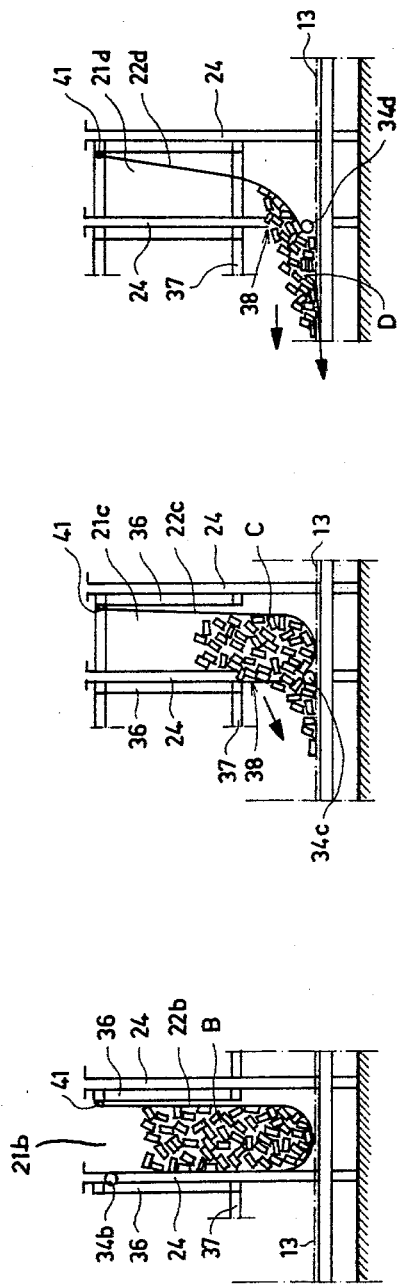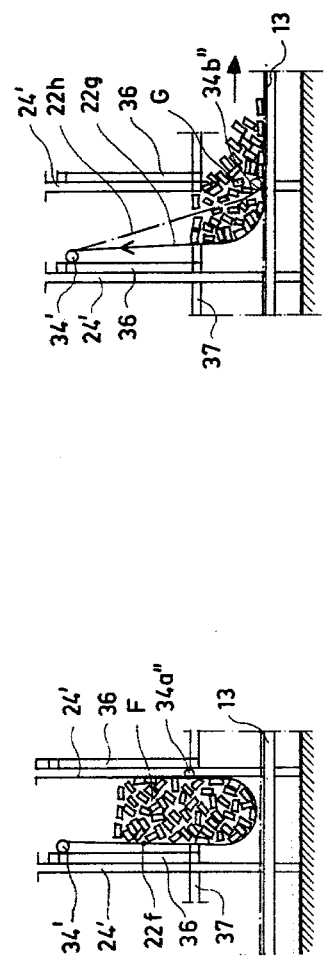

METHOD AND APPARATUS FOR SORTING TIMBER

BACKGROUND OF THE INVENTION

This invention relates to timber sorting apparatus, and more particularly to such apparatus which sorts timber into various compartments and empties the compartments onto an output conveyor.

Timber sorting apparatus are known where timber is delivered along an input conveyor and sorted based upon size or type into one of a plurality of compartments. A particular type or size of timber batch is respectively collected in each compartment. When a compartment is sufficiently filled, the timber is transferred mainly by gravity action onto a conveyor system located beneath the compartments. The timber is transported from the compartments to other treatment, such as packaging.

A number of prior compartment designs for timber sorting installations are known. By way of example, reference is made to applicant's Finnish patent Nos. 44532, 49815, 51684 and 52528. Reference is also made to U.S. Pat. Nos. 3,085,686, 3,653,506, and 3,696,948.

One type of compartment design utilizes flexible supports which form a compartment bag. The flexible supports permit the compartment bag to expand as the quantity of timber is accumulated into it. Such design avoids damage to the timber since the compartment bags are used with flexible supports. Such flexible supports typically utilized are chains, belts or straps.

However, one difficulty with utilizing such compartment bags concerns the opening of the compartment and emptying its contents onto the conveyor positioned therebeneath. Previously, such opening has been achieved by disconnecting one end of the flexible supports forming the compartment bag, and emptying the timber. Subsequent to the elimination of the timber, the end is refixed to again form the compartment bag. Such actions required for emptying the compartments have been time consuming and presented a limiting factor in the capacity and capability of such sorting installations.

SUMMARY OF THE INVENTION

Generally speaking, in accordance with the present invention there is provided a sorting apparatus for sorting timber into different compartments. The apparatus includes an input conveyor which delivers the timber to the compartments. A plurality of the compartments are available for selectively receiving the timber from the input conveyor. An output conveyor selectively collects the timber from the compartments and transports the collected timber therefrom. Each of the compartments comprises a flexible support which is retained between compartment dividing walls. Lowering means are included for selectively lowering each flexible support beneath its dividing wall to form an opening in the compartment through which the timber can empty onto the output conveyor. A tightening means is also included for pulling the flexible support taut in order to completely discharge the timber from the compartment.

In accordance with the invention, there is also provided a method for eliminating the timber from a timber sorting installation. The timber sorting installation selectively sorts the timber into various compartments with each compartment having a flexible support. The compartments are then emptied onto a conveyor mechanism therebeneath for removal of the collected timber. The method includes the steps of expanding the flexible supports of each compartment as the timber is collected therein. The flexible support is then lowered beneath the compartment walls to form an opening through which the timber can pass in order to empty the compartment. The flexible support is then pulled taut whereby all of the collected timber will empty from the compartment.

Accordingly, it is an object of the present invention to provide a sorting apparatus which provides simplified opening of the compartments.

A further object of the present invention is to provide a sorting apparatus which includes a compartment bag which can expand to receive timber collected therein.

Still another object of the present invention is to provide a sorting apparatus for sorting timber, which includes a plurality of compartments having flexible supports therein wherein the flexible supports can be easily lowered to permit discharge of the timber stored therein onto an output conveyor.

Another object of the present invention is to provide a method of opening compartments in a sorting apparatus in order to release timber stored therein.

Still other objects and advantages of the invention will, in part, be obvious and will, in part, be apparent from the specification.

The invention accordingly comprises the features of construction, combinations of elements, and the arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic elevational view of the sorting installation in accordance with the invention;

FIG. 2 is a schematic elevational view of one compartment of the sorting installation;

FIG. 3 is a side elevational view of the single compartment shown in FIG. 2;

FIGS. 4, 5 and 6 are schematic elevational views of a single compartment showing various stages in the releasing of the contents of the compartment, wherein FIG. 4 shows the compartment filled, FIG. 5 shows the compartment opened with the contents in the process of being discharged, and FIG. 6 shows the completion of the discharging process;

FIGS. 7 and 8 show schematic elevational views of a single compartment showing another embodiment of the discharging of the contents from the compartment, wherein FIG. 7 shows the compartment filled and the emptying commencing, and FIG. 8 shows the discharging at a later stage.

DESCRIPTION OF THE PREFERRED EMBODIMENTS

Referring now to FIG. 1, there is shown the timber sorting installation which includes an input conveyor 11 on which the pieces of cut timber are dispensed by means of the supports 12. The timber is brought to the installation by means of the dispenser 10 which is itself known in the prior art. In connection with the supports 12 there is associated a control means (not shown) which is well known in the art, by means of which the various pieces of timber carried on the supports can be selectively dropped into the compartments in order to sort the timber. Such timber can be sorted by means of its quality and/or size.

Beneath the input conveyor 11 is the sorting apparatus 20, comprising a plurality of consecutive sorting compartments 21 each defined by vertical walls 36 separating the compartments, and a connecting horizontal beam 37. Typically, there are several dozen such compartments in order to provide a proper sort. Beneath the sorting apparatus is an output conveyor 13 which is shown as consisting of two cooperating sections 13a and 13b which partly overlap at a common end 13c. Timber batches can then be transferred from the compartment section 20 onto the output conveyor 13 mainly by means of gravity action. Two such timber batches are shown by the reference numeral C and D. These are transported by means of the output conveyor to other sections for further operation on the timber. For example, it can be transported to a packaging section. Such packaging stations are typically located in conjunction with the ends of both the conveyor sections. The output conveyor moves the timber to the dispensing section 14 where the timber is transferred onto another conveyor 15 going to the packaging station, which is in itself known in the art, whereby the packages 17 are formed. One such batch of timber designated E is shown in the process of being transferred to the dispersing section 14.

As shown in FIGS. 2-6, the individual compartments are formed by a series of flexible supports 22, of which five are shown forming each compartment, as is shown in FIG. 3. The flexible supports are connected at one end to a point adjacent the top of the vertical dividing walls 36 at point 41. The other ends of the flexible supports 22 are wound respectively on reels 35 which in turn are carried on a shaft 34. In order to maintain the shaft 34 and permit it to move in a vertical direction, the shaft is attached at its ends, designated L and B, to respective ends of cables 32 and 33, as shown by the dotted lines. More particularly, cable 32 has one end affixed to the end L of shaft 34 and runs over the pulleys 30 and 31 and extends downward and over a pulley 28 connected at the end of a hydraulic cylinder 26 and upwardly where its other end is affixed at 29; Cable 33 has one end affixed to the end R of shaft 34 and runs over pulley 30 and extends downward and over pulley 28 and upwardly where it is also affixed at 29. The bottom of the cylinder is securely fixed at its lower ends to the attachment point 27. By extending the piston rod within its cylinder 26, the cables 32 and 33 permit the shaft 34 to descend in a vertical direction. Guides 24 are provided adjacent the walls 36 to permit vertical movement of the shaft 34 there within, whereby the shaft 34 can extend downward all the way to the transporting level of the output conveyor 13. At one end, the shaft is driven by the motor 23. Since the shaft 34 carries the reels 35 on which the flexible supports 22 are wound, by operating the motor 23, the flexible supports 22 can be shortened or lengthened. The controls for the operation of the motor 23 are schematically illustrated in FIG. 3 by the block 39. Similarly, there is shown a block 40 for the control of the hydraulic cylinder 26. Such controls are well known in the art. Various modes of operation can be achieved by suitable synchronizing of the control means 23 and 40.

With reference now to the FIGS. 2-6 the operation of the apparatus just described will now be explained. Also, a first embodiment of the method of operation will be described. It should be noted that in FIG. 1 there are shown various ones of the compartments at various stages of filling. For example, compartment 21a is shown as being filled to about ½ its capacity with cut timber. The compartment 21c has been opened by lowering the shaft 34c downward upon the output conveyor 13a whereby the cut timber batch C is discharged onto the output conveyor. The compartment 21d is shown as being almost completely emptied so that the greater part of its timber batch D is now onto the output conveyor 13b.

As shown in FIG. 2, as additional cut timber is formed into the batch A, the flexible supports 22a contain the timber in the form of a compartment bag. As more timber arrives, the supports 22a are lengthened by unwinding the ends of the flexible supports 22a by causing the motor 23 to operate the reels 35. The shaft 34a is stationary adjacent the top of its dividing wall 36. As shown in FIG. 4, when the compartment bag has been substantially filled to capcity by the timber batch B, the shaft 34b begins to move downwardly within its vertical guides 24. As the shaft 34b reaches a position below the vertical walls 36, of the compartment, it will be beneath the beam 37. The compartment will then be opened and the timber batch will be permitted to leave. This is shown in FIG. 5 wherein the shaft 34c has been lowered down to the output conveyor 13 and the compartment is opened through the opening 38 permitting the timber to leave as shown by the arrow.

As shown in FIG. 5, when the shaft 34c has come down, its ends are still guided within the vertical guides 24. Once the shaft has been lowered completely, as shown in FIG. 5, the next step can be commenced as shown in FIG. 6. The flexible supports 22d are pulled taut by winding the ends of the supports onto the reels 35 carried on the shaft 34d. As the supports 22d are rolled onto their respective reels, since the other ends of the supports are connected at the point 41, the flexible supports are straightened out and pulled tightly. In this manner they force the remaining part of the timber batch D out of the compartment and onto the output conveyor. After the timber batch D has completely left its compartment, the shaft 34d can then be raised through its vertical guide 24. This is achieved by lowering the piston and causing the cables 32 and 33 to lift the shaft 34d through its vertical guides 24. The ends of the flexible supports 22d are then wound onto the reels 35 whereby the compartment is again ready to receive the next batch of timber.

Referring now to FIGS. 7 and 8, there is shown another embodiment for carrying out the present invention. According to this embodiment, the shaft 34' is held stationary in the vertical direction and is positioned near the top of its dividing walls 36. The fixed shaft supports the reels. The flexible supports 22f are wound onto those reels. The other ends of the flexible supports are not fixed. Instead, they are connected to a horizontal member 34a. This can consist of a rod, by way of example, which can be lowered with the aid of cables connected to a hydraulic cylinder, as heretofore described. The hydraulic cylinder can be connected from a lower position as in the previous example, or from an upper position (not shown) adjacent to the upper ends of the vertical walls 36. As timber is accumulated into the compartment bag, the flexible supports 22f are lengthened either by releasing them from their respective reels on the supporting shaft 34' or by lowering the horizontal component 34a within its respective guides 24'. As shown in FIG. 7, the compartment bag formed with the supports 22f are filled with the timber batch F. The horizontal components 34a" has been lowered to a point where it is approximately planar with the horizontal beam 37. Once the horizontal component 34a" is lowered further, the compartment bag will be opened and the timber can be discharged.

Referring now to FIG. 8, there is shown a compartment wherein the horizontal component 34b" has been lowered beneath the wall 36 and beneath the beam 37 to form an opening whereby the batch of timber G can discharge from the bag. The horizontal member 34b" is shown descended within its guides 24' down to the output conveyor 13. At this point, the flexible supports 22g can be pulled tightly by reeling onto their reels supported on the shaft 34'. In FIG. 8, the position assumed by the flexible supports after they have been pulled tightly is shown by dotted lines 22h. In this position, it forces the timber to transfer onto the output conveyor and forces the compartment bag to completely empty.

After the steps shown in FIG. 8, the horizontal member 34b" can be raised by means of its supporting cables within its respective guides 24' into its upper position. The flexible supports 22 can then be wound on their respective reels supported on the shafts 34'. If required, in the tightening step of the flexible supports one may utilize a specific type of locking means in conjunction with the horizontal member 34b" so that the horizontal member is kept securely in its lowered position while the flexible supports are being pulled taut.

In addition to the embodiment heretofore shown, modifications may be made in the examples shown in FIGS. 7 and 8 so that the horizontal member 34" which connects the flexible supports can also carry reels, in which case the flexible supports 22 can be reeled on both the fixed shaft 34' and the movable shaft 34". It is also possible to arrange an additional attachment to the shaft 34' so that it too can be vertically movable, suspended from cables and pass through corresponding guides. In this way, emptying of the compartment bag can be achieved in a faster time. Also, replacing the bag after its discharging operation can be also completed in a faster amount of time.

The expanding of the compartment bag as well as the lengthening of the flexible supports 22 can be arranged to occur by means of a motor 23 or similar drive means under positive control or, by way of example, a friction brake or counterweight. The flexible supports 22 do not have to be made entirely out of a chain, strap or the like since in those parts of the supports 22 which are not wound upon the reels there may include, by way of example, rigid bar-like sections typically connected together.

There has been disclosed heretofore the best embodiments of the invention presently contemplated. However, it is to be understood that various changes and modifications may be made thereto without departing from the spirit of the invention.

What is claimed is:

1. A sorting apparatus for selectively sorting timber into different compartments, comprising an input conveyor for delivering the timber to the compartments, a plurality of compartments for selectively receiving the timber from the input conveyor, and an output conveyor for selectively collecting the timber from the compartments and transporting it therefrom, each of said compartments comprising a flexible support retained between compartment dividing walls, means for lowering the flexible support beneath the dividing walls to form an opening in said compartment through which the timber can empty onto the output conveyor, wherein said lowering means comprises a horizontal member coupled to at least one end of each flexible support, and vertical guide means positioned with respect to each compartment through which its corresponding horizontal member can pass in a direction substantially parallel to said dividing walls, and tightening means for pulling said flexible supports taut.

2. The sorting apparatus of claim 1, wherein said output conveyor is beneath the compartments, and wherein said lowering means lowers the flexible supports to the output conveyor.

3. The sorting apparatus of claim 1, wherein said horizontal member comprises a shaft whose opposing ends respectively pass through said vertical guide means to permit upward and downward movement thereof, and wherein said tightening means comprises a reel having an end of said flexible support wound thereon.

4. The sorting apparatus of claim 3, wherein one end of each flexible support is fixedly attached adjacent the upper end of one dividing wall of its respective compartment, each of the shafts carries a reel, and wherein the other ends of each flexible support is wound on its respective reel.

5. The sorting apparatus of claim 3, wherein one end of each of said flexible supports is fixedly attached to its respective shaft, and further comprising a stationary shaft coupled to the other dividing wall of each compartment, said reel being rotatingly carried on each of said stationary shafts, and the other end of said flexible supports being wound onto its respective reel.

6. A sorting apparatus as in claim 3, wherein both ends of each flexible support are respectively coupled to shafts, and wherein there is a reel rotatingly carried by at least one of the shafts associated with each flexible support, one end of each flexible support being wound onto its respective reel.

7. A sorting apparatus as in claim 1, and further comprising pulley means coupled to each horizontal member for manipulating its upward and downward movement within its respective vertical guide means, a piston and cylinder arrangement for controlling the operation of said pulley means.

8. A sorting apparatus as in claim 1, and further comprising first control means for operating said lowering means, and second control means for operating said tightening means.

9. In a timber sorting installation, wherein timber is sorted into selective compartments, each compartment being defined by compartment walls having a flexible support at least one end of which is connected to a horizontal member, and wherein the compartments are selectively emptied onto a transport mechanism therebeneath for removal of the collected timber therefrom, the method comprising:
 expanding the flexible support of each compartment as the timber collects therein;
 lowering at least one end of the flexible support beneath the compartment walls to form an opening through which the collected timber can be discharged in order to empty the compartments, said lowering comprising the step of moving the horizontal member in a downward direction through vertical guides, and pulling the flexible supports taut whereby all of the collected timber will empty from the compartment.

10. The method of claim 9, wherein said horizontal members are lowered onto said transport mechanism.

11. The method of claim 9, and further comprising the steps of lowering and tightening the flexible supports by winding one of its ends around a reel.

12. The method of claim 9, wherein said horizontal member is lowered through its vertical guide as the quantity of timber in the compartment increases.

* * * * *